United States Patent [19]

Hutto et al.

[11] Patent Number: 4,776,627
[45] Date of Patent: Oct. 11, 1988

[54] WIND DEFLECTOR AND BUG SCREEN CLIP

[76] Inventors: Ernest Hutto, 608 Lillian Dr., Orlando, Fla. 32806; Charles A. Tovey, 1660 Cheyenne Trail, Maitland, Fla. 32751

[21] Appl. No.: 164,808
[22] Filed: Mar. 7, 1988
[51] Int. Cl.$^4$ ............................................. B60K 11/02
[52] U.S. Cl. ...................................... 296/91; 180/68.6
[58] Field of Search ............... 296/91, 95 Q; 180/68.6

[56] References Cited

U.S. PATENT DOCUMENTS

| | | | |
|---|---|---|---|
| 3,015,517 | 1/1962 | Thornburgh | 296/91 |
| 4,153,129 | 5/1979 | Redmond | 296/91 |
| 4,178,034 | 12/1979 | Mittendorf | 296/91 |
| 4,236,592 | 12/1980 | Ziegler | 296/91 |
| 4,364,596 | 12/1982 | Geisendorfer | 296/91 |
| 4,471,991 | 9/1984 | Matthias | 296/91 |
| 4,518,191 | 5/1985 | Williams et al. | 180/68.6 |
| 4,547,013 | 10/1985 | McDaniel | 296/91 |
| 4,621,860 | 11/1986 | Gerst | 296/91 |

Primary Examiner—Robert B. Reeves
Assistant Examiner—Joseph D. Pape
Attorney, Agent, or Firm—William M. Hobby

[57] ABSTRACT

A wind deflector and bug screen clip apparatus is used in connection with an air current deflector shield which is attached to a vehicle with a supporting channel member attached to the bottom of the shield and has a detachable cover attachable to the front of the vehicle and to the front of the air current deflector shield. A clip member for attaching the attachable cover to the air current deflector shield has a body having a pair of slots formed therein with a predetermined shape for sliding onto the supporting channel member of the air current deflector shield with a snap portion formed on the front thereof for attaching to snap portions on the detachable cover. The clips can be slid onto an existing air current deflector shield supporting member and the detachable cover readily attached to the snap portion formed on each clip.

6 Claims, 1 Drawing Sheet

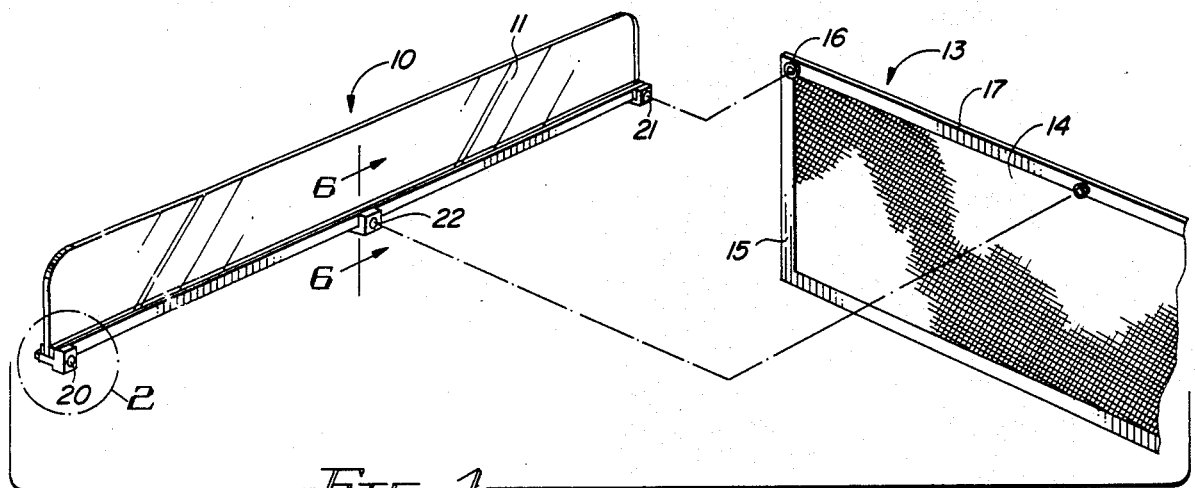
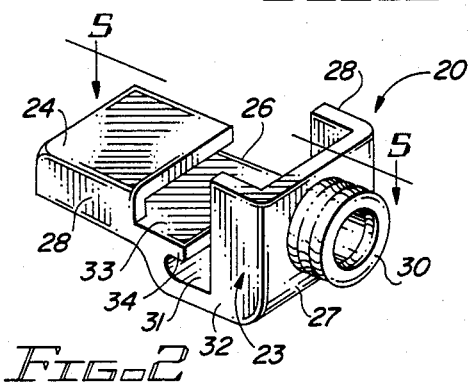
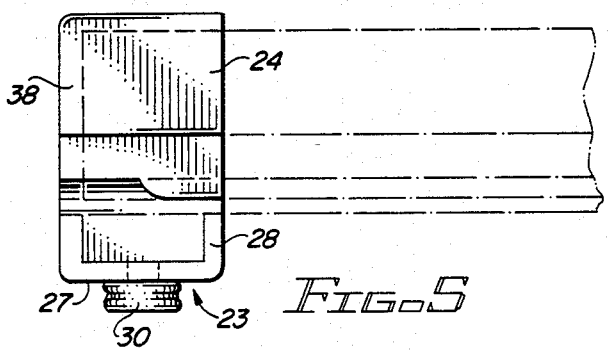
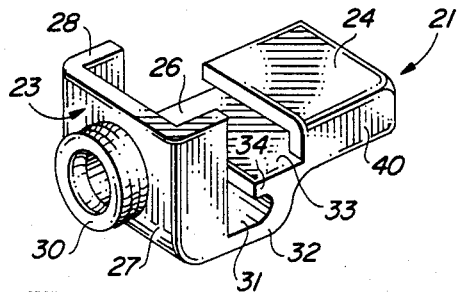
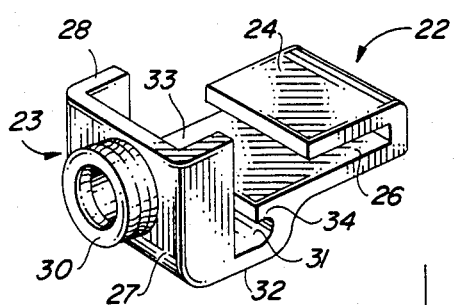
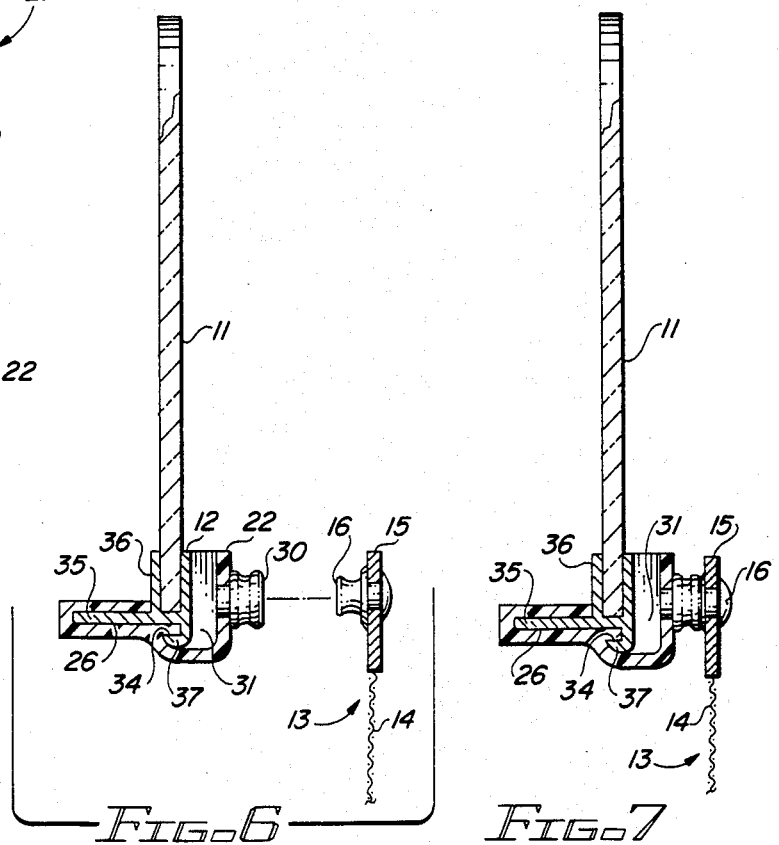

WIND DEFLECTOR AND BUG SCREEN CLIP

BACKGROUND OF THE INVENTION

The present invention relates to an air current deflector shield and bug screen clip and especially to a clip which can be slid onto an air current deflector shield supporting channel for snapping a bug screen thereonto.

Insect screens have generally been designed to cover the grille area of automobiles and trucks and have been made in various shapes for some time. The purpose of these screens have been to stop insects and debris from entering the grille and interfering with the operation of the radiator. Insect bodies and parts can disrupt the air flow through the radiator and result in a condition of overheating. In addition, insects and debris mar and wear the front surfaces of vehicles and can make the vehicle unsightly.

Air deflector shields are usually mounted onto vehicle hoods directly above the radiator grille and have been employed for the purpose of changing the air flow pattern over the hood of a moving vehicle and thus protecting the windshield from insects and debris. The effectiveness of such apparatus has been proven and deflection shields have been in use for some years, especially in areas where flying insects pose a problem during certain seasons of the year. Because both the hood mounted air deflector shield and the grille covering insect screen are concerned with reducing the effects of insects encountered while driving, a more conveniently mounted combination of the two devices is in a desirable arrangement. Several prior U.S. patents have such combinations and this includes to Ziegler U.S. Pat. No. 4,236,592 and U.S. Pat. Nos. 3,815,700; 3, 831,696; and 3,853,728 which disclose means by which the radiator and windshield of a moving vehicle may be protected from insects and debris. A perforated screen is mounted directly in front of the radiator grille and has an upper portion made of unperforated material extending above the hood line to deflect air along with insects and debris upward and away from the windshield. Mounting provisions in three of these patents are similar in that the screens depend upon elastic or adjustable cords to secure them to points within the front wheel well with the visual effect being one of impermanence. In addition, the cords extend over painted areas and, in general, provide a less than pleasing appearance. U.S. Pat. No. 2,868,308 discloses a similar screen and deflector combination with provisions for mounting in an inclined position in front of the radiator grille of a vehicle such that radiator and windshield are protected. In U.S. Pat. No. 2,246,823 an apparatus has both a screen for keeping insects from entering the radiator of a vehicle and an adjustable nonperforated curtain to selectively limit air flow through the radiator and thereby control the operating temperature of the vehicle engine. This particular invention makes no provision for the protection of a vehicle from airborne insects in that the screen is mounted between the grille and the radiator. In the to Daniels et al., U.S. Pat. No. 4,627,657, a truck deflector shield is illustrated in which the shield portion has a mounting channel which is bolted to the front of the vehicle. The Geisendorfer patent, U.S. Pat. No. 4,364,596, is for a vehicle protective deflector having visual enhancement and illuminating means.

A series of air current deflector shields for vehicles can been seen in Thornburgh, U.S. Pat. No. 3,015,517, for an air current deflector shield having a polymer shield mounted to a supporting channel which is threadedly bolted to the underside of the front of the hood of the vehicle. In the Redmond patent, U.S. Pat. No. 4,143,129, an air current deflector shield similarly has a polymer deflector shield attached to a supporting channel which is bolted to the underside of the hood. The Williams et al patent, U.S. Pat. No. 4,518,191, is for an air current deflector shield and bracket combination using a different bracket combination for holding the shield and attaching to the vehicle. Finally, the Gerst patent, U.S. Pat. No. 4,621,860, is for a combination wind deflector and bug screen having a clip portion for use in connection with the deflector shield supporting bracket which allows the attaching of the screen to eyelets connected to clips.

In contrast to these prior inventions, the present application is for a molded polymer clip which can be slid onto the supporting channels for deflector shields and has molded polymer snap portions formed on the front thereof and are shaped to interact with the support channels to provide sufficient strength and rigidity for snapping bug screen snap portions thereonto for holding the top side of the bug screens.

SUMMARY OF THE INVENTION

The present invention relates to a wind deflector and bug screen clip for use with an air current deflector shield for attaching to a vehicle. The air current deflector shield has a supporting channel or member attached to the bottom thereof and a detachable cover attachable to the front of the vehicle having the air current deflector shield attached thereto. The clip member is for attaching a detachable cover to the air current deflector shield and has a body having a pair of slots formed therein of a predetermined shape for sliding onto the supporting member body for attaching snap portions attached to the detachable cover so that clips can be quickly slid onto the supporting member of the air current deflector shield and the bug screen clipped thereto for detachably attaching said bug screen cover without special tools. The slots in the clip member body may include an elongated first slot having a horizontally elongated U-shaped cross section and a second slot having a generally vertically extending slot forming a partial U cross section. The clip member body second slot can have a horizontally protruding lip extending over a portion thereof forming a third horizontally extending slot portion. The clip member body ca be of a molded polymer having a molded polymer snap portion formed on the front thereof.

BRIEF DESCRIPTION OF THE DRAWINGS

Other objects, features, and advantages of the present invention will be apparent from the written description and the drawings in which FIG. 1 is an exploded perspective view of an air deflector shield and bug screen having clips in accordance with the present invention attached thereto;

FIG. 2 is a perspective view of a first air deflector shield and bug screen clip in accordance with the present invention;

FIG. 3 is a second perspective view of a second air deflector shield and bug screen clip in accordance with the present invention;

FIG. 4 is a perspective view of yet a third air deflector shield and bug screen clip;

FIG. 5 is a sectional view taken on the line 5—5 of FIG. 2;

FIG. 6 is a sectional view taken on the line 6—6 of FIG. 1; and

FIG. 7 is a sectional view in accordance with FIG. 6 having a bug screen attached to the bug screen clip on the air deflector shield.

DESCRIPTION OF THE PREFERRED EMBODIMENT

Referring to the drawings and especially to FIG. 1, an air current deflector shield 10 is illustrated having a transparent polymer shield portion 11 attached to a supporting channel or support member 12 extending the length of the bottom of the shield portion 11. A detachable cover or bug screen 13 is illusrated having a perforated screen portion 14 and reinforcing edges 15 extending therearound. Snap portions 16, which may be male or female but preferably female snap portions, can be seen attached along the top portion 17 of the attachable cover 13. A detachable cover attaching clip 20 is seen attached to one end of supporting channel 12 while a second clip 21 is attached on the other end thereof and a third clip 22 is attached in the center portion along the channel 12. The clips 20, 21 and 22 are slid onto the shield support member or channel 12, as shown in FIG. 1, and positioned for attaching the snap portions 16 of the detachable cover 13 thereto and to the front of a vehicle.

FIG. 2 illustrates the left end polymer clip 20 while FIG. 3 illustrates the right end 21 polymer clip and FIG. 4 illustrates a center clip 22. Each of the clip portions has a body 23 having a horizontally extending portion 24 and a vertically extending portion 25. Each horizontally extending portion 24 has an elongated slot 26 formed therein while each vertically extending portion 25 has a front wall 27 and a pair of backwardly extending wall portions 28. Front wall portion 27 has a snap portion 30 formed therein as part of an integrated single molded clip unit. The snap portion 30 may be female or male as desired but coordinates with the opposite clip portion 16 on the detachable cover 13. The clip body 23 forms a vertically extending slot 31 extending to a dropped bottom wall 32 while part of the horizontal wall 33 extends over a portion of the slot 31 to form a lip 34. The clip body 23 is specifically designed to slide onto an existing channel or supporting member 12 used in connection with supporting air deflector shield bodies 11. The supporting or mounting channel 12 also has horizontally extending portions 35 and a groove formed by two upright extending portions 36 and a bottom hook portion 37 and may be attached to the underside of the front hood of a vehicle.

The left end clip 20, as shown in FIG. 2, has an end wall 38 on the left end side which allows it to be slid only as far as the end of a supporting channel 12 can slide until it contacts the wall 38 over each slot 26. The right end clip 21 is identical to the left end clip of FIG. 2 except it has a wall 40 on the opposite end of the slot 26 to stop the clip 21 from sliding any further onto the support channel 12 and will allow the horizontal extension 35 of the support member 12 to abut against the inside wall 40. The middle clip 22, as shown in FIG. 4, is the same as the clips shown in FIGS. 2 and 3 except it does not have a wall covering either end of the side of the slot 26 and thus will allow this clip or several of these clips to be slid onto the supporting channel 12 to any position desired for alignment with the appropriate snap portion 16.

The attaching of the clips along with the bug screen 13 is illustrated in connection with FIGS. 6 and 7 in which a clip 22 has been slid onto the shield 11 support channel 12 with a slot 26 having the horizontally extending channel portion 35 extending therethrough and the hook portion extending down under the lip 34 in the vertical slot 31 to support and mount the front wall 27 supporting the snap portion 30 facing the front of the clip 21. The bug screen or detachable cover 13 having the screen 14 thereon and the supporting edge 15 has a snap portion 16 mounted thereto for snapping onto the snap portion 30 as shown in FIG. 7.

It should be clear at this time that an air deflector shield and bug screen clip has been provided which can be advantageously molded in an injection mold and can be rapidly slid onto an existing air deflector shield supporting channel either being placed on a vehicle or attached to a vehicle to allow the attaching of the detachable cover or bug screen directly thereto without the use of special tools or without marring the finish of the vehicle. However, the present invention is not to be construed limited to the forms shown which are to be considered illustrative rather than restrictive.

We claim:

1. An air deflector shield and bug screen clip comprising:
    an air current deflector shield for attaching to a vehicle said air current deflector shield having a supporting member attached to the bottom thereof; and a detachable cover attachable to the front of a vehicle having said air current deflector shield attached thereto; the improvement including:
    a clip member for attaching said detachable cover to said air current deflector shield and having a body having a pair of slots formed therein of a predetermined shape for sliding onto said supporting member of said air current deflector shield; and said clip member having a snap portion formed on the front thereof for attaching snap portions on said detachable cover whereby a detachable cover can be readily attached to said snap portions formed on said air current deflector shield without special tools.

2. An air deflector shield and bug screen clip in accordance with claim 1 in which said clip member body pair of slots has a first slot having a horizontal elongated U shape cross-section.

3. An air deflector shield and bug screen clip in accordance with claim 2 in which said clip member body pair of slots has a second slot having a generally vertically extending slot.

4. An air deflector shield and bug screen clip in accordance with claim 3 in which said clip member body second slot has a horizontal protruding lip extending over a portion thereof forming a third horizontally extending slot.

5. An air deflector shield and bug screen clip in accordance with claim 4 in which said clip member body snap portion is a female snap portion formed as part of said clip body.

6. An air deflector shield and bug screen clip in accordance with claim 5 in which said clip member body is a molded polymer having a molded polymer snap portion.

* * * * *